US012589997B2

(12) United States Patent
Li et al.

(10) Patent No.: US 12,589,997 B2
(45) Date of Patent: Mar. 31, 2026

(54) METHOD FOR PREPARING LITHIUM SULFIDE BY USING METALLIC LITHIUM

(71) Applicant: JIANGXI GANFENG LITHIUM INDUSTRY CO., LTD., Xinyu (CN)

(72) Inventors: Liangbin Li, Xinyu (CN); Cui Liao, Xinyu (CN); Zhifang Pan, Xinyu (CN); Ming Ye, Xinyu (CN); Zhihua Hu, Xinyu (CN); Jianyong Zhang, Xinyu (CN); Bin Hu, Xinyu (CN); Maonv Liao, Xinyu (CN); Zhong Hu, Xinyu (CN); Xiaokang Liu, Xinyu (CN)

(73) Assignee: JIANGXI GANFENG LITHIUM INDUSTRY CO., LTD., Xinyu (CN)

( * ) Notice: Subject to any disclaimer, the term of this patent is extended or adjusted under 35 U.S.C. 154(b) by 483 days.

(21) Appl. No.: 18/025,912

(22) PCT Filed: Feb. 21, 2022

(86) PCT No.: PCT/CN2022/076980
§ 371 (c)(1),
(2) Date: Mar. 13, 2023

(87) PCT Pub. No.: WO2022/144037
PCT Pub. Date: Jul. 7, 2022

(65) Prior Publication Data
US 2023/0365407 A1 Nov. 16, 2023

(30) Foreign Application Priority Data
Dec. 31, 2020 (CN) .......................... 202011626538.5

(51) Int. Cl.
*C01B 17/22* (2006.01)
*H01M 10/0562* (2010.01)
(52) U.S. Cl.
CPC ......... *C01B 17/22* (2013.01); *H01M 10/0562* (2013.01); *H01M 2300/0068* (2013.01)

(58) Field of Classification Search
CPC .............. C01B 17/22; H01M 10/0562; H01M 2300/0068
See application file for complete search history.

(56) References Cited

FOREIGN PATENT DOCUMENTS

| | | | | |
|---|---|---|---|---|
| CN | 104609376 A | * | 5/2015 | ............. C01B 17/22 |
| CN | 108190845 A | * | 6/2018 | ............. C01B 17/22 |
| CN | 108358175 A | | 8/2018 | |
| CN | 111392700 A | * | 7/2020 | ........... C01B 25/081 |
| CN | 111517288 A | | 8/2020 | |
| CN | 112110421 A | * | 12/2020 | ............. C01B 17/22 |
| CN | 112607712 A | | 4/2021 | |
| JP | H09110404 A | | 4/1997 | |

OTHER PUBLICATIONS

English machine translation of CN-111392700-A. (Year: 2020).*
English machine translation of CN-104609376-A. (Year: 2015).*
English machine translation of CN-112110421-A. (Year: 2020).*
English machine translation of CN-108190845-A. (Year: 2018).*

* cited by examiner

*Primary Examiner* — Paul A Wartalowicz
*Assistant Examiner* — Nicholas A. Piro
(74) *Attorney, Agent, or Firm* — HOWARD M COHN and Associates, LLC

(57) ABSTRACT

A method for preparing lithium sulfide by using metallic lithium includes steps A-D. The step A includes placing 0.05-0.1 kg of the metallic lithium and a first sulfur powder into a sealed container under an inert condition according to a mass ratio of the metallic lithium to the first sulfur powder being 1:0.8-1:1. The step B includes placing the sealed container into a vacuum oven at 250-300° C. and holding for 2-3 h, then adding second first sulfur powder and heating at 250-300° C. for 2-3 h, and finally adding first sulfur powder and heating at 250-300° C. for 2-3 h to obtain a crude lithium sulfide product. The step C includes ball-milling on the crude lithium sulfide product to obtain a ball-milled lithium sulfide. The step D includes adding the ball-milled lithium sulfide into a mixed solution of isopropanol and xylene to obtain a lithium sulfide slurry.

3 Claims, No Drawings

METHOD FOR PREPARING LITHIUM SULFIDE BY USING METALLIC LITHIUM

CROSS REFERENCE TO THE RELATED APPLICATIONS

This application is the national phase entry of International Application No. PCT/CN2022/076980, filed on Feb. 21, 2022, which is based upon and claims priority to Chinese Patent Application No. 202011626538.5, filed on Dec. 31, 2020, the entire contents of which are incorporated herein by reference.

TECHNICAL FIELD

The present invention relates to a method for preparing lithium sulfide by using metallic lithium.

BACKGROUND

Lithium-ion batteries are not only widely used in the fields of consumer electronics and communication, but also have wide development prospects in the fields of electric vehicles, smart power grids and the like. Liquid batteries, which are commonly adopted in commercial lithium batteries at present, have high conductivity, but there are problems such as insufficient electrochemical and thermal stability, and poor safety. Replacing the liquid batteries with inorganic solid-state batteries can well avoid the above problems. At present, inorganic solid electrolytes are close to commercial applications, among which sulfide electrolytes have the advantages of higher ionic conductivity, easy formation of skeleton structure, good electrochemical stability and the like, and have drawn great attention in the academic and commercial circles. Lithium sulfide is an important raw material for the synthesis of sulfide solid electrolytes, but its high price restricts the popularization of sulfide solid-state batteries. However, it has been publicly reported that Toyota, Samsung, and other companies have introduced mature sulfide solid-state battery structures, which are currently entering the stage of cost reduction.

SUMMARY

Based on the above, it is necessary to provide a method for preparing lithium sulfide by using metallic lithium to address the above-mentioned problems.

In order to achieve the above-mentioned objective, the present invention provides the following technical solutions.

Provided is a method for preparing lithium sulfide by using metallic lithium, comprising the following steps:

step A: placing 0.05-0.1 kg of metallic lithium and a corresponding sulfur powder into a 5-10 L sealed container under an inert condition according to a mass ratio of 1:0.8-1:1;

step B: placing the sealed container charged with lithium and the sulfur powder in step A into a vacuum oven at 250-300° C. and holding for 2-3 h, then adding an equal amount of sulfur as in step A followed by heat preservation for 2-3 h, and finally adding an equal amount of sulfur as in step A followed by heat preservation for 2-3 h;

step C: placing a crude lithium sulfide product obtained after high-temperature firing into a sealed ball-milling tank, and performing ball-milling at room temperature at a rotation speed of 100-500 r/min for 12-24 h;

step D: under an inert gas, taking out a powder from the ball-milling tank, then adding the obtained ball-milled lithium sulfide into a mixed solution of isopropanol/xylene according to a mass-to-volume ratio of 1:5, and stirring for 1-2 h;

step E: under an inert gas, filtering a lithium sulfide slurry obtained after stirring with a G4 sand core funnel, and then adding 500-1000 mL of n-hexane for rinsing to obtain a lithium sulfide wet material; and step F: placing the obtained lithium sulfide wet material into a vacuum drying oven at 205° C., and drying in vacuum for 8-12 h to obtain a lithium sulfide product.

Further, the mixed solution of isopropanol/xylene used in step D has a mixing ratio of 1:2 and a moisture content of <50 ppm.

Further, the inert gas in step D and step E is argon or nitrogen.

At present, the price of metallic lithium is 450,000 yuan/ton, and the price of sulfur is about 2,000-3,000 yuan/ton. The final cost of the preparation of lithium sulfide by the reaction of metallic lithium with sulfur will be less than 500,000 yuan/ton after mass production, while the price of the current commercial lithium sulfide is generally 10 million yuan/ton. Therefore, the preparation of lithium sulfide by the reaction of metallic lithium with sulfur can greatly reduce the cost, and ultimately facilitates the comprehensive popularization of sulfide solid-state electrolytes.

According to the method for preparing lithium sulfide by using metallic lithium disclosed herein, metallic lithium and sulfur are difficult to react at room temperature. Sulfur is in a liquid state at a temperature above 100° C., while metallic lithium has a melting point of 180° C. When the two substances are in a liquid state at 250-300° C., their contact angles can be increased, and thus a reaction will occur. The reaction temperature is controlled at 250-300° C., so that the reaction can be carried out more mildly, and the violent heat release can be avoided in the reaction. After the preliminary reaction at high temperature, most of the metallic lithium (about 95% or more) has been reacted. Meanwhile, the remaining ductile metallic lithium after high-temperature treatment easily turns into a hard and brittle state, and can become a lithium powder through ball-milling. After the ball-milling is performed, due to the increased contact area, the remaining sulfur will continue to react with most of the residual lithium powder at room temperature. Meanwhile, the ball-milled lithium sulfide has finer primary particles and a better crystalline state. By purifying with the mixed solution of isopropanol/xylene, the residual metallic lithium will react with isopropanol, and the excess sulfur powder will be dissolved in xylene. When the moisture content of the mixed solution of isopropanol/xylene is controlled to be less than 50 ppm, the side reaction between lithium sulfide and water can be effectively avoided. Lithium sulfide is difficult to dissolve in the mixed solution of isopropanol/xylene, so that a refined lithium sulfide wet material can be obtained. Finally, after washing with n-hexane and drying in vacuum, lithium sulfide has a main content above 99.98% and high purity.

Compared with the prior art, the method for preparing lithium sulfide by using metallic lithium disclosed herein features the advantages of simple and practical process, low production cost, less pollution, high production safety and energy conservation. The prepared lithium sulfide has small primary particles, high purity and good crystallinity, so the method is suitable for industrial production.

DETAILED DESCRIPTION OF THE EMBODIMENTS

The present invention provides a method for preparing lithium sulfide by using metallic lithium, comprising the following steps:

step A: placing 0.05-0.1 kg of metallic lithium and a corresponding sulfur powder into a 5-10 L sealed container under an inert condition according to a mass ratio of 1:0.8-1:1;

step B: placing the sealed container charged with lithium and the sulfur powder in step A into a vacuum oven at 250-300° C. and holding for 2-3 h, then adding an equal amount of sulfur as in step A followed by heat preservation for 2-3 h, and finally adding an equal amount of sulfur as in step A followed by heat preservation for 2-3 h;

step C: placing a crude lithium sulfide product obtained after high-temperature firing into a sealed ball-milling tank, and performing ball-milling at room temperature at a rotation speed of 100-500 r/min for 12-24 h;

step D: under an inert gas, taking out a powder from the ball-milling tank, then adding the obtained ball-milled lithium sulfide into a mixed solution of isopropanol/xylene according to a mass-to-volume ratio of 1:5, and stirring for 1-2 h;

step E: under an inert gas, filtering a lithium sulfide slurry obtained after stirring with a G4 sand core funnel, and then adding 500-1000 mL of n-hexane for rinsing to obtain a lithium sulfide wet material; and step F: placing the obtained lithium sulfide wet material into a vacuum drying oven at 205° C., and drying in vacuum for 8-12 h to obtain a lithium sulfide product.

Further, the mixed solution of isopropanol/xylene used in step D has a mixing ratio of 1:2 and a moisture content of <50 ppm.

Further, the inert gas in step D and step E is argon or nitrogen.

Example 1

A. Mixing under an inert condition: 0.05 kg of metallic lithium and a corresponding sulfur powder were placed into a 5 L sealed container under an inert condition according to a mass ratio of 1:0.08.

B. High-temperature firing: The sealed container charged with lithium and the sulfur powder in step A was placed into a vacuum oven at 250° C. and held for 3 h, then an equal amount of sulfur as in step A was added followed by heat preservation for 3 h, and finally an equal amount of sulfur as in step A was added followed by heat preservation for 3 h.

C. Sealed ball-milling: The crude lithium sulfide product obtained after high-temperature firing was placed into a sealed ball-milling tank, and ball-milling was performed at room temperature at a rotation speed of 100 r/min for 12 h.

D. Dissolution and purification: Under an inert atmosphere, a powder was taken out from the ball-milling tank, and then the obtained ball-milled lithium sulfide was added into a mixed solution of isopropanol/xylene according to a mass-to-volume ratio of 1:5. The resulting mixture was stirred for 1 h.

E. Rinsing and filtration: Under an inert atmosphere, a lithium sulfide slurry obtained after stirring was filtrated with a G4 sand core funnel, and then 500 mL of n-hexane was added for rinsing once to obtain a lithium sulfide wet material.

F. Drying in vacuum: The obtained lithium sulfide wet material was placed into a vacuum drying oven at 205° C. and dried in vacuum for 8 h to obtain a lithium sulfide product.

Example 2

A. mixing under an inert condition: 0.07 kg of metallic lithium and a corresponding sulfur powder were placed into a 7.5 L sealed container under an inert condition according to a mass ratio of 1:0.09.

B. High-temperature firing: The sealed container charged with lithium and the sulfur powder in step A was placed into a vacuum oven at 280° C. and held for 2.5 h, then an equal amount of sulfur as in step A was added followed by heat preservation for 2.5 h, and finally an equal amount of sulfur as in step A was added followed by heat preservation for 2.5 h.

C. Sealed ball-milling: The crude lithium sulfide product obtained after high-temperature firing was placed into a sealed ball-milling tank, and ball-milling was performed at room temperature at a rotation speed of 300 r/min for 18 h.

D. Dissolution and purification: Under an inert atmosphere, a powder was taken out from the ball-milling tank, and then the obtained ball-milled lithium sulfide was added into a mixed solution of isopropanol/xylene according to a mass-to-volume ratio of 1:5. The resulting mixture was stirred for 1.5 h.

E. Rinsing and filtration: Under an inert atmosphere, a lithium sulfide slurry obtained after stirring was filtrated with a G4 sand core funnel, and then 800 mL of n-hexane was added for rinsing once to obtain a lithium sulfide wet material.

F. Drying in vacuum: The obtained lithium sulfide wet material was placed into a vacuum drying oven at 205° C. and dried in vacuum for 10 h to obtain a lithium sulfide product.

Example 3

A. Mixing under an inert condition: 0.1 kg of metallic lithium and a corresponding sulfur powder were placed into a 10 L sealed container under an inert condition according to a mass ratio of 1:1.

B. High-temperature firing: The sealed container charged with lithium and the sulfur powder in step A was placed into a vacuum oven at 300° C. and held for 2 h, then an equal amount of sulfur as in step A was added followed by heat preservation for 2 h, and finally an equal amount of sulfur as in step A was added followed by heat preservation for 2 h.

C. Sealed ball-milling: The crude lithium sulfide product obtained after high-temperature firing was placed into a sealed ball-milling tank, and ball-milling was performed at room temperature at a rotation speed of 500 r/min for 24 h.

D. Dissolution and purification: Under an inert atmosphere, a powder was taken out from the ball-milling tank, and then the obtained ball-milled lithium sulfide was added into a mixed solution of isopropanol/xylene according to a mass-to-volume ratio of 1:5. The resulting mixture was stirred for 12 h.

E. Rinsing and filtration: Under an inert atmosphere, a lithium sulfide slurry obtained after stirring was filtrated with a G4 sand core funnel, and then 1000 mL of n-hexane was added for rinsing once to obtain a lithium sulfide wet material.

F. Drying in vacuum: The obtained lithium sulfide wet material was placed into a vacuum drying oven at 205° C. and dried in vacuum for 12 h to obtain a lithium sulfide product.

According to the method for preparing lithium sulfide by using metallic lithium disclosed herein, metallic lithium and sulfur are difficult to react at room temperature. Sulfur is in a liquid state at a temperature above 100° C., while metallic lithium has a melting point of 180° C. When the two substances are in a liquid state at 250-300° C., their contact angles can be increased, and thus a reaction will occur. The reaction temperature is controlled at 250-300° C., so that the reaction can be carried out more mildly, and the violent heat release can be avoided in the reaction. After the preliminary reaction at high temperature, most of the metallic lithium (about 95% or more) has been reacted. Meanwhile, the remaining ductile metallic lithium after high-temperature treatment easily turns into a hard and brittle state, and can become a lithium powder through ball-milling. After the ball-milling is performed, due to the increased contact area, the remaining sulfur will continue to react with most of the residual lithium powder at room temperature. Meanwhile, the ball-milled lithium sulfide has finer primary particles and a better crystalline state. By purifying with the mixed solution of isopropanol/xylene, the residual metallic lithium will react with isopropanol, and the excess sulfur powder will be dissolved in xylene. When the moisture content of the mixed solution of isopropanol/xylene is controlled to be less than 50 ppm, the side reaction between lithium sulfide and water can be effectively avoided. Lithium sulfide is difficult to dissolve in the mixed solution of isopropanol/xylene, so that a refined lithium sulfide wet material can be obtained. Finally, after washing with n-hexane and drying in vacuum, lithium sulfide has a main content above 99.98% and high purity.

Compared with the prior art, the method for preparing lithium sulfide by using metallic lithium disclosed herein features the advantages of simple and practical process, low production cost, less pollution, high production safety and energy conservation. The prepared lithium sulfide has small primary particles, high purity and good crystallinity, so the method is suitable for industrial production.

The above description is only for the purpose of illustrating the specific examples of the present invention, and should not be construed as the protection scope of the present invention. Any equivalent variations and modifications made in accordance with the design spirit of the present invention shall fall within the protection scope of the present invention.

What is claimed is:

1. A method for preparing lithium sulfide by using metallic lithium, comprising the following steps:

step A: placing 0.05-0.1 kg of the metallic lithium and a first sulfur powder into a 5-10 L sealed container under an inert condition according to a mass ratio of the metallic lithium to the first sulfur powder being 1:0.8-1:1;

step B: placing the 5-10 L sealed container charged with the first metallic lithium and the first sulfur powder in step A into a vacuum oven at 250-300° C. and holding for 2-3 h, then adding a second sulfur powder at an amount equal to an amount of the first sulfur powder into the vacuum oven and heating at 250-300° C. for 2-3 h, and finally adding a third sulfur powder at an amount equal to the amount of the first sulfur powder into the vacuum oven and heating at 250-300° C. for 2-3 h to obtain a crude lithium sulfide product;

step C: placing the crude lithium sulfide product into a sealed ball-milling tank, and performing ball-milling at room temperature at a rotation speed of 100-500 r/min for 12-24 h to obtain a ball-milled lithium sulfide;

step D: under an inert gas, taking out the ball-milled lithium sulfide from the ball-milling tank, then adding the ball-milled lithium sulfide into a mixed solution of isopropanol and xylene with a mass-to-volume ratio of the ball-milled lithium sulfide to the mixed solution being 1:5, and stirring for 1-2 h to obtain a lithium sulfide slurry;

step E: under the inert gas, filtering the lithium sulfide slurry with a G4 sand core funnel, and then rinsing with 500-1000 mL of n-hexane to obtain a lithium sulfide wet material; and step F: placing the lithium sulfide wet material into a vacuum drying oven at 205° C., and drying in vacuum for 8-12 h to obtain a lithium sulfide product.

2. The method for preparing the lithium sulfide by using the metallic lithium according to claim 1, wherein the mixed solution of the isopropanol and the xylene used in step D has a mixing ratio of the isopropanol to the xylene being 1:2 and a moisture content of less than 50 ppm.

3. The method for preparing the lithium sulfide by using the metallic lithium according to claim 1, wherein the inert gas in step D and step E is argon or nitrogen.

* * * * *